Patented Apr. 27, 1948

2,440,315

UNITED STATES PATENT OFFICE 2,440,315

SENSITIZED PYROGALLOL REAGENT AND METHOD FOR ITS PREPARATION

Richard L. Tuve, Silver Spring, Md.

No Drawing. Application April 16, 1945,
Serial No. 588,518

4 Claims. (Cl. 252—408)

(Granted under the act of March 3, 1883, as amended April 30, 1928; 370 O. G. 757)

My invention relates to the analysis of water for dissolved oxygen and particularly it relates to a specially sensitive reagent for use in determining very minute traces of dissolved oxygen in water such as boiler feedwater, which has been previously deaerated.

In general, micro-determinations of elements depend upon colorimetric tests. That is, a reagent is made to react with an element which is present in a solution in minute quantity, the reagent being selected so that its reaction with the element being studied produces an intense coloration. Because of the minute quantity present, gradations in the color produced can be used as measures of the concentration of the element which is being detected. Such colorimetric methods of analysis are particularly applicable to situations where it is desired to determine the amount of a relatively insoluble gas dissolved in a liquid. An example of this type of reaction, and the one in which I am particularly interested, is the determination of traces of dissolved oxygen in water. Colorimetric methods of analysis for the determination of oxygen in substantial amounts are fairly common and in general are reasonably satisfactory. However, recent developments in deaeration apparatus for the purpose of freeing boiler feedwater from small amounts of dissolved gases such as oxygen have been so effective that reagents used in the ordinary colorimetric methods have a threshold of sensitivity which is above the concentration of oxygen found in the deaerated boiler feedwater.

Colorimetric methods of analysis depending upon the use of a light source and a photo-electric cell for measuring the intensity of a color developed necessarily require a reagent which will produce an intense color with the minutest quantities of oxygen in order to avoid construction of an apparatus having a long light absorption cell of awkward dimensions. For example, the use of the standard Winkler reagent to produce free iodine in solution in proportion to the amount of dissolved oxygen is a reaction insufficiently sensitive for an accurate colorimetric analysis when the amount of oxygen dissolved in the water is below one-tenth of one milliliter per liter of water. With this reagent the intensity of the color of iodine developed is too low to be measured in a photo-electric absorption cell of compact dimensions.

The Binder and Wieland reagent comprising an alkaline solution of catechol containing traces of ferrous sulfate is not feasible for it is practically impossible to obtain a colorless solution to start with since the red color produced by dissolved oxygen becomes very dense even upon the slightest exposure of the solution to air.

It is an object of my invention to obviate the difficulties encountered in determining small traces of oxygen dissolved in water by preparing a solution having a balanced sensitivity, that is, a sensitivity which can be proportioned to the amount of dissolved oxygen it is expected will be detected in the solution.

A second object of my invention is to show how a more or less conventional reagent for detection and analysis of oxygen-containing gases namely, pyrogallol and similar compounds, can be adapted to the determination of quantities of oxygen dissolved in water which are below the threshold of sensitivity of the conventional solutions of the reagent.

It is another object of my invention to provide a method of preparing highly sensitive solutions of reagents for the determination of extremely minute amounts of dissolved oxygen in water.

Other objects and advantages of my invention will in part be obvious and in part appear hereinafter.

I have discovered that the more or less conventional reagents for the analysis of gaseous mixtures for oxygen, namely, alkaline solutions of hydroquinone, chlorohydroquinone, bromohydroquinone, paramidophenol hydrochloride, metamethoxy parahydroxy aniline sulfate, monomethyl para amido phenol sulfate and 2, 4 diamidophenol hydrochloride, react with dissolved oxygen to give a color which has possibilities for use in the quantitative colorimetric determination of comparatively large amounts of dissolved oxygen in water. I do not claim as my invention the discovery that these conventional reagents which are sensitive to oxygen give a color reaction when exposed to dissolved oxygen. I have discovered, however, that solutions of such reagents which present definite thresholds of sensitivity to oxygen can be sensitized in a manner such that they become useful for the detection of very small traces of dissolved oxygen. This threshold of sensitivity affects the rate-of-change-of-color-with-oxidation characteristic of the agent such that the rate of change of color, or sensitivity, as a function of the degree of oxidation is initially very low, and after the oxidation reaction has run for a short period of time changes almost abruptly to a considerably higher rate of change of color.

The nature, scope and practice of my invention can be more easily understood by restricting to some extent the detailed description to a single well-known example, namely, pyrogallol. Pyrogallol is one of the most easily obtained and one of the best reagents known for use in analyzing gas mixtures for their oxygen content. It is relatively stable and it is very sensitive to oxygen, especially in the form of its alkali-metal salt. Its use as a reagent for stripping oxygen out of gas mixtures presents none of the difficulties encountered in conducting colorimetric analyses. Solutions of pyrogallol which have become deeply colored or even blackened and contain quantities of precipitate can be used when the sole object is to strip oxygen from a mixture of gases. However, when it is attempted to use pyrogallol as a colorant for the detection and indication of the presence and amount of dissolved oxygen in quantities on the order of six-thousandths of one milliliter of oxygen per liter of water, rigid adherence to a standard is necessary. That is, the pyrogallol solution which is added to the water being analyzed, must either possess a constant known amount of color at the start of the analysis or must be colorless.

Experience with the continuous and automatic analysis of water for oxygen content using photoelectric colorimetric methods and a pyrogallol solution as a colorant or indicator, emphatically showed that for complete operativeness it was necessary to use freshly prepared pyrogallol solutions and, even though the solutions were freshly prepared, the calibration of the apparatus became very markedly displaced within a few hours of operation of the apparatus. The difficulty was readily traced to a progressive change in the sensitivity of the pyrogallol solution. For reasons not clearly understood, the pyrogallol, like the other oxygen sensitive reagents enumerated above, possesses the variable rate of change of color with degree of oxidation characteristic. This is exhibited by a very slow rate of change of the color of the initially clear pyrogallol solution, when first subjected to oxygen, to a light pink. At the threshold of sensitivity of the pyrogallol, the color of the solution would be seen to begin to change progressively very rapidly to a deep blue, if a large amount of oxygen were present. Not only was it noted that the sensitivity of the solution varied, but it was also found that the solution was insufficiently sensitive to give a deep or readily measurable color change with exceedingly minute traces of dissolved oxygen in the water.

The oxidation of pyrogallol has been postulated by Willstatter and Heiss to occur as follows:

Apparently the first few steps of this oxidation of pyrogallol take place quite readily and account for the quick change in the sensitivity of a pyrogallol solution when it is used as an oxygen detecting reagent. The intermediate reactions however are apparently much more sensitive to oxygen than the first one or two.

I have discovered a method of partially oxidizing a pyrogallol solution, arresting the oxidation at the point of maximum sensitivity of the pyrogallol to oxygen, thus making it possible by this partial oxidation to prepare an alkaline pyrogallol solution extremely sensitive to dissolved oxygen. The point at which the partial oxidation of the pyrogallol should be arrested can only be determined empirically by oxidizing a group of samples under the same temperature and concentration conditions for different periods of time and noting the time immediately after which the rapid rate of color change begins to take place. It is also the purpose of this invention to stabilize this partial oxidation product so that it can be preserved for a substantial length of time without change. The method of sensitizing a pyrogallol solution can be more easily understood by the following example in which the steps of carrying out the sensitization reaction are described in detail.

*Example*

A solution of 240 milliliters of distilled water containing 130 grams of chemically pure pyrogallol and one-half milliliter of concentrated sulphuric acid (36.N) is heated to a temperature of 98° to 100° C. Immediately after bringing the solution to this temperature, ten milliliters of accurately standardized 10% hydrogen peroxide solution is added and the total solution held at 98°–100° C. with moderate agitation for a reaction time of ten minutes. Upon the expiration of the ten-minute reaction period, 26 grams of oxalic acid is added and the solution immediately cooled by running cold water around the outside of the flask.

The preparation of pyrogallol solution for oxygen determination in substantially the manner indicated gives a fairly concentrated solution of a partially oxidized pyrogallol which can be measured out and diluted to standard strength when it is used for the determination.

After preparation of the partially oxidized solution in a manner analogous to that indicated in the example, its preservation can be readily accomplished by sealing it into ampoules to keep

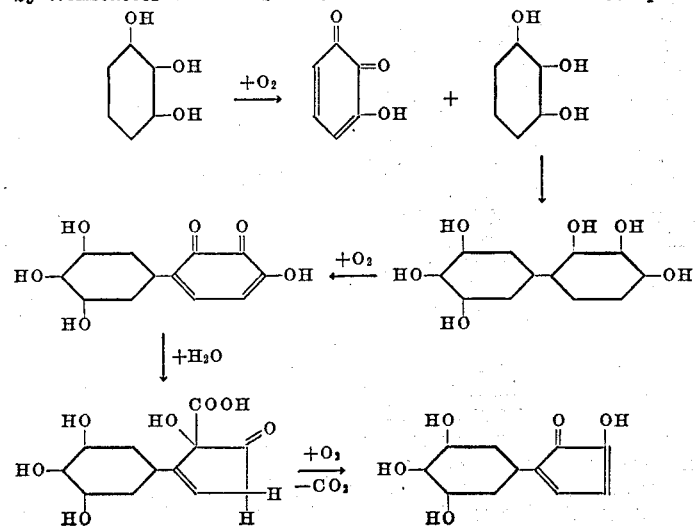

oxygen from coming in contact with it and thereby slowly changing its sensitivity or its color. The ampoule subsequently provides a convenient means of preparing a standard solution for oxygen determination by alkalization and dilution to a standard volume. It is a relatively simple matter to prepare an ampoule having a thin wall whereby it can be dropped into a graduated flask, smashed and its contents immediately diluted up to a standard volume and used in an analysis.

The example given above was specifically given with reference to pyrogallol and reaction time, reagents and quantities were given in the example such that a maximum sensitivity could be obtained. Hydrogen peroxide is an excellent oxidizing agent to use in partially oxidizing the oxygen detecting solution because in aqueous solution hydrogen peroxide decomposes to form nascent oxygen, which is dissolved oxygen, and is in exactly the form in which the solution would normally detect it. Its reaction by-products are oxygen and water, neither of which is detrimental to the resultant solution. It also may be easily discharged after the necessary reaction time by the addition of oxalic acid, forming water only. Other oxidizing agents of approximately the same oxidizing potential as hydrogen peroxide can be used but they suffer the disadvantage that they leave in the solution extraneous components which can introduce unknown factors. For example, sodium perborate could also be used partially to oxidize the pyrogallol solution. In solution sodium perborate forms sodium metaborate and hydrogen peroxide. The hydrogen peroxide would function substantially as the hydrogen peroxide I used in my example but the sodium metaborate would remain behind in the solution to create difficulties due to its alkalinity. In a similar manner, various other mild oxidizing agents have their faults.

By noting the structures of the several reducing agents mentioned above as oxygen sensitive material which can be used for the analysis of oxygen, it will be apparent that they too oxidize progressively to some final product. In each case, to a greater or lesser degree, a change in sensitivity of a solution of the reagent to oxygen has been noted. By methods analogous to that described in the example given above the several solutions of these reagents can be sensitized to the determination of dissolved oxygen.

From the example given relating to the partial oxidation of a pyrogallol solution to render it maximally sensitive to dissolved oxygen, it will be noted that after a given reaction time a reducing agent, namely, oxalic acid, was added to stop the oxidation and the solution cooled immediately. Various reducing agents can be used in similar fashion to stop the oxidation, among which are sodium sulphite, sodium bisulphite, sodium hydrosulphite. These reagents are quite satisfactory as reducing agents to be used to stop the reaction but have the disadvantage that they are strong enough to react with the partially oxidized pyrogallol slowly and after a given period of time such as 9 to 10 days a noticeable reduction in the sensitivity caused by a reducing action of the sulphite type of reducing agent with the pyrogallol may be apparent.

Since different embodiments of the invention could be made without departing from its scope, it is intended that all matter contained in the above description shall be interpreted as illustrative and not in a limiting sense.

The invention described herein may be manufactured and used by or for the Government of the United States of America for governmental purposes without the payment of any royalties thereon or therefor.

Having described my invention, what I claim as new and desire to secure by Letters Patent of the United States is:

1. The method of rendering pyrogallol solution proportionally sensitive to minute traces of dissolved oxygen, comprising, dissolving pyrogallol in water, reacting said solution of pyrogallol with a water soluble oxidizing agent, and stopping the oxidation at the point of maximum sensitivity of pyrogallol to oxygen by adding to the solution a sufficient amount of a reducing agent to eliminate excess oxygen which reducing agent produces no discoloration of the said solution upon reaction therewith.

2. The method of, preparing a pyrogallol solution proportionally sensitive to dissolved oxygen in amounts less than one one-hundredth of one milliliter per liter of solution, comprising, dissolving in oxygen-free water a known amount of pyrogallol, reacting said solution of pyrogallol at a temperature of 95° to 105° C. for 1 to 15 minutes with a solution of hydrogen peroxide, and, after the reaction time, stopping the oxidation by adding to the solution a sufficient amount of oxalic acid to eliminate excess oxygen.

3. The method of, preparing a pyrogallol solution proportionally sensitive to dissolved oxygen in amounts less than one one-hundredth of one milliliter per liter of solution, comprising, dissolving in oxygen-free water a known amount of pyrogallol, reacting said solution of pyrogallol at a temperature of 95° to 105° C. for substantially 10 minutes with a solution of hydrogen peroxide, and, after the reaction time, stopping the oxidation by adding to the solution a sufficient amount of oxalic acid to eliminate excess oxygen.

4. As a new product, a clear substantially colorless, partially oxidized, aqueous solution of pyrogallol characterized by sensitivity to amounts of dissolved oxygen of the order of five one-thousandths of one milliliter per liter of solution and by a relatively rapid rate of color change upon further oxidation in proportion to the amount of dissolved oxygen, made by the method as defined in claim 1.

RICHARD L. TUVE.